United States Patent [19]
Chin

[11] Patent Number: 5,950,030
[45] Date of Patent: Sep. 7, 1999

[54] FILM CARTRIDGE MOUNTING MECHANISM FOR AN EXTERIOR FILM-FEEDING CAMERA

[76] Inventor: Hsin-Yuan Chin, 9F, No. 22, Lane 24, Sec. 1, Huan Shan Rd., Nei Hu., Taipei, Taiwan

[21] Appl. No.: 09/005,717

[22] Filed: Jan. 12, 1998

[51] Int. Cl.[6] .................................................. G03B 1/00
[52] U.S. Cl. ......................................... 396/416; 396/535
[58] Field of Search .............................. 396/6, 416, 535, 396/538

[56] References Cited

U.S. PATENT DOCUMENTS

| | | | |
|---|---|---|---|
| 2,367,195 | 1/1945 | Bolsey | 396/416 |
| 2,709,050 | 5/1955 | Mansberg | 396/538 X |
| 3,603,232 | 9/1971 | Jones | 396/411 |
| 3,782,259 | 1/1974 | Noble | 396/6 |
| 4,690,534 | 9/1987 | Chen-Liang | 396/535 X |
| 5,664,250 | 9/1997 | Wakabayashi | 396/538 |
| 5,822,633 | 10/1998 | Miyawaki et al. | 396/538 |

*Primary Examiner*—Howard B. Blankenship
*Attorney, Agent, or Firm*—W Wayne Liauh

[57] ABSTRACT

A film cartridge mounting mechanism for use in an exterior film-feeding camera is disclosed which allows the camera to be more compact in size, more convenient and portable to use, at a substantially reduced cost. It includes (a) an exposed accommodation chamber on one side of a main body of the camera, the exposed accommodation chamber having an arc shaped contact surface with the camera for receiving a film cartridge; (b) a positioning base and a top plate provided in the accommodation chamber, wherein the position base having and the top plate form a lower bound and upper bound, respectively, of the accommodation chamber; (c) a plurality of restraints provided in the position base having and the top plate for anchoring a film cartridge; and (d) an inlet for introducing a film from the film cartridge into a film-conveying slot in the camera main body.

4 Claims, 9 Drawing Sheets

5,950,030

FILM CARTRIDGE MOUNTING MECHANISM FOR AN EXTERIOR FILM-FEEDING CAMERA

BACKGROUND OF THE INVENTION (1) Field of the Invention

The present invention relates to a film cartridge mounting mechanism for use in an exterior film-feeding camera and is particularly applicable to a 35-mm simple-structured camera. In the film cartridge mounting mechanism of the present invention, the film is externally anchored to the camera, thus making the camera more compact, light-weight, and more convenient.

(2) Description of the Prior Art

Although the current camera technology is now focused on the digital camera which provides improved convenience, yet the conventional cameras, such as the single-lens camera, the automatic camera, and the disposal camera, still have their own market. For example, the single-lens camera facilitates the adjusting of focus, shutter, and photo-taking head better and allows a variety of the photographing operations. The automatic camera (known as a fools camera) operates extremely easily and is widely used for its convenience. The disposable camera at lower price solves the embarrassing situation wherein a camera is not available but is immediately needed. However, some consider using a single-lens camera requires advanced photo-taking technique, and is expensive, thus is not desirable. Some consider the automatic camera is always at a higher price and there is no justified reason to purchase one if photo-taking is occasional. The major shortcoming of the disposable camera is the non-refillable film system, which makes a higher unit price for single photo.

Therefore, an invention devoting to resolving aforesaid disadvantages of conventional cameras is necessary.

SUMMARY OF THE INVENTION

Accordingly, it is a primary object of the present invention to provide a film cartridge mounting mechanism for use in an exterior film-feeding camera, for constructing a compact, portable, and low-cost camera so as to allow the anchoring of the film outside the main body of the camera.

The present invention is primary applicable to a 35-mm simple-structured camera, which has an exposed accommodation space on one side of the camera's main body for receiving and anchoring a film shell. A positioning base and a top plate form the lower and the upper bounds of the externally exposed accommodation space, respectively. The contact surface between the main body and the film cartridge is arc shaped. The rest of the film cartridge is exposed to the atmosphere. Thereby, the film cartridge is anchored by the restraints provided on the inner surfaces of the positioning base and the top plate. The film outlet of the film cartridge and the nozzle inlet of the film-conveying slot on the main body is [photo-proof] engaged in a light-proof manner.

All these objects are achieved by the film cartridge mounting mechanism for an exterior film-feeding camera described below.

BRIEF DESCRIPTION OF THE DRAWINGS

The present invention will now be specified with reference to its preferred embodiment illustrated in the drawings, in which

FIG. 5 is a prospective view of the preferred film-switching plate of the film cartridge mounting mechanism for an exterior film-feeding camera in accordance with the present invention.

DESCRIPTION OF THE PREFERRED EMBODIMENT

Figure 1:
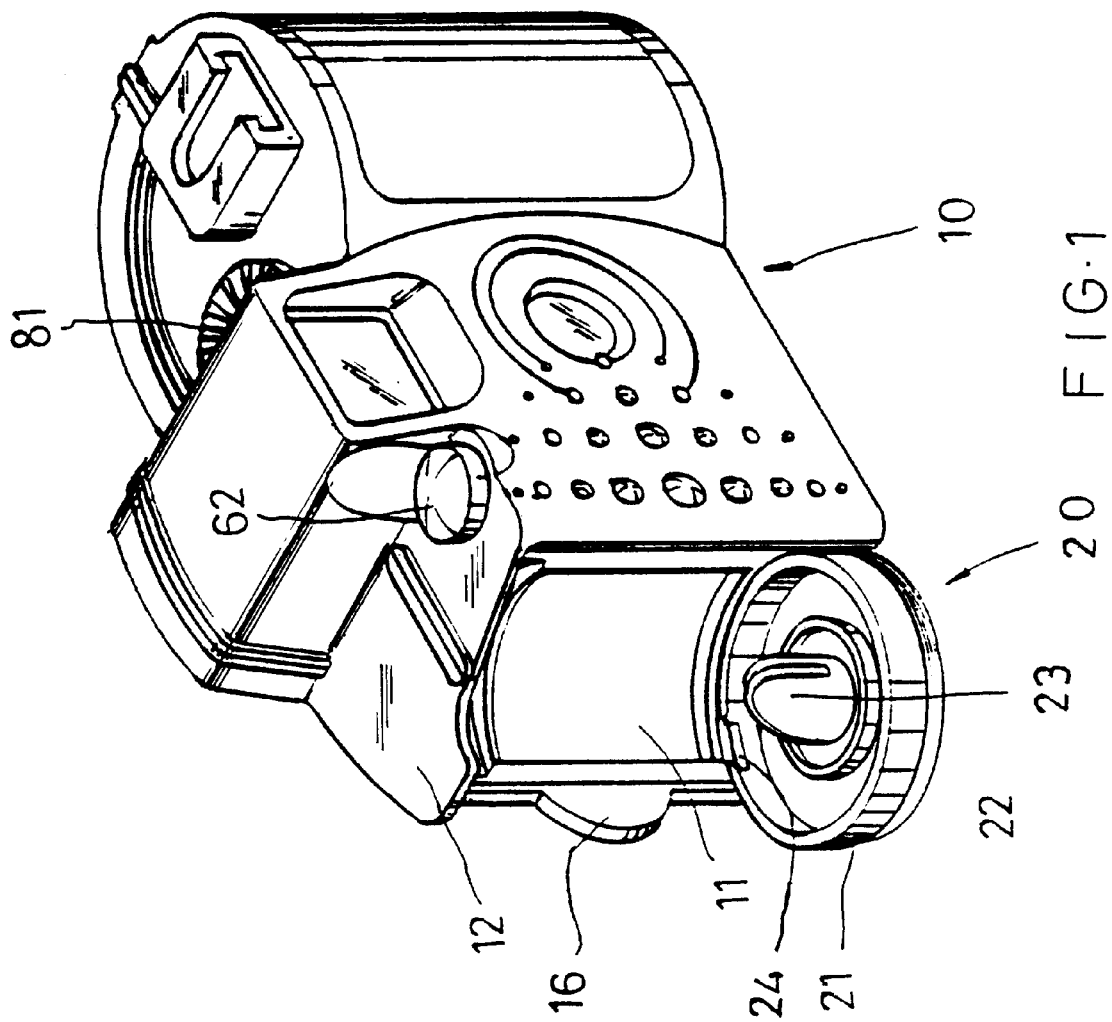
FIG. 1 is a prospective view of the preferred film cartridge mounting mechanism for an exterior film-feeding camera in accordance with the present invention.
Figure 2:
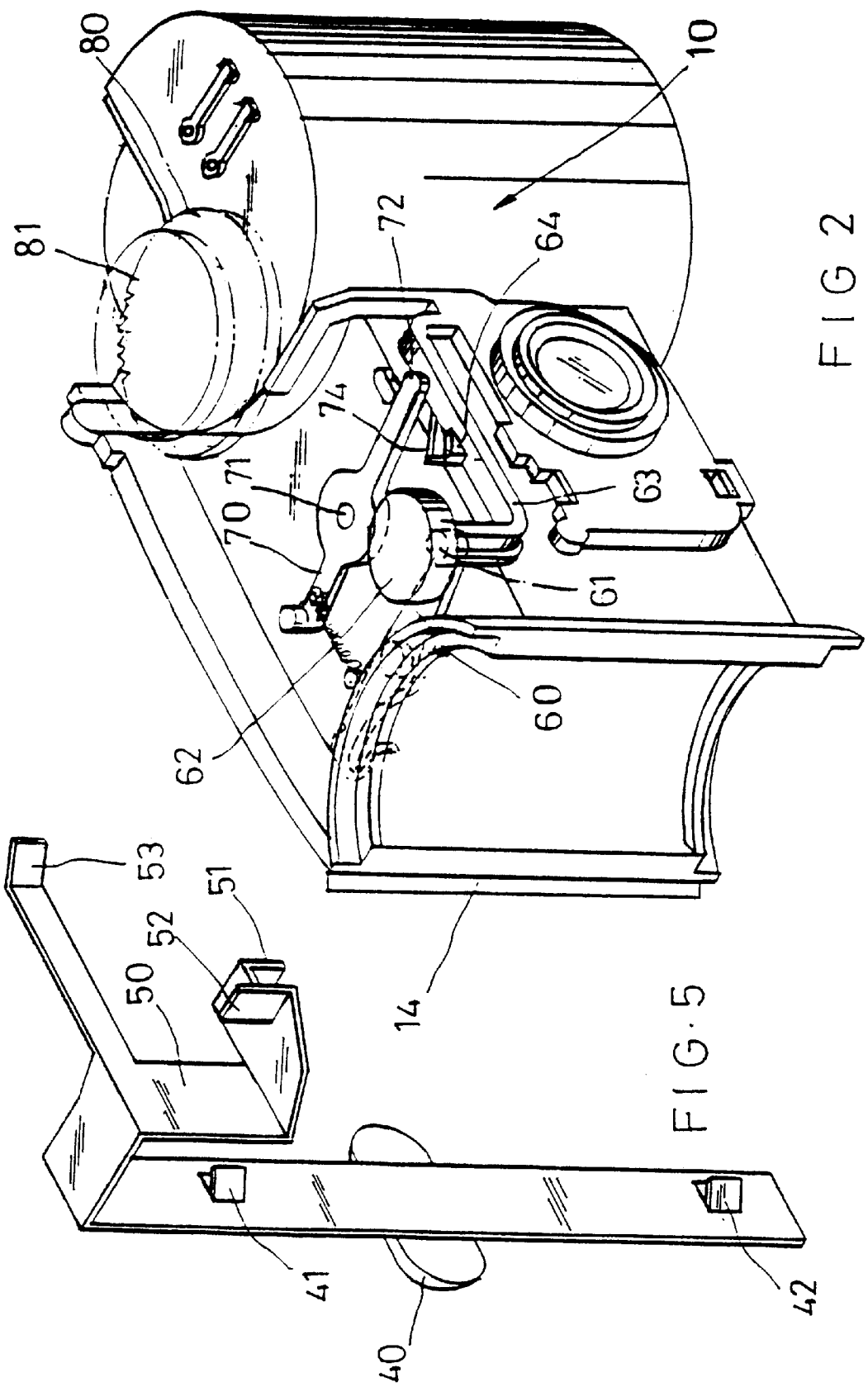
FIG. 2 is a prospective view of the main body of the camera by lifting away its front cover.
Figure 3:
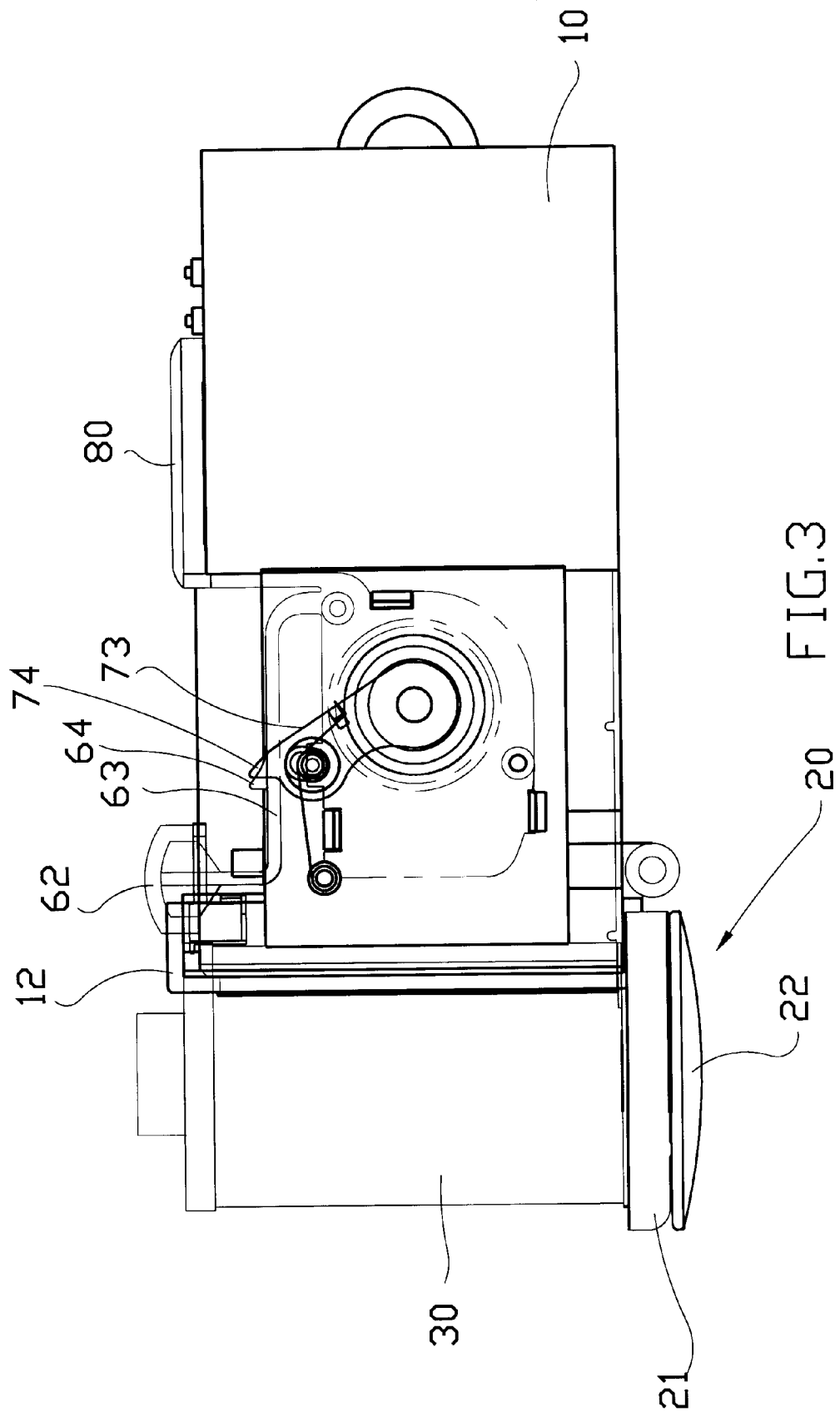
FIG. 3 is a schematic view of installing a film cartridge to the preferred embodiment of the film cartridge mounting mechanism for an exterior film-feeding camera in accordance with the present invention.
Figure 4:
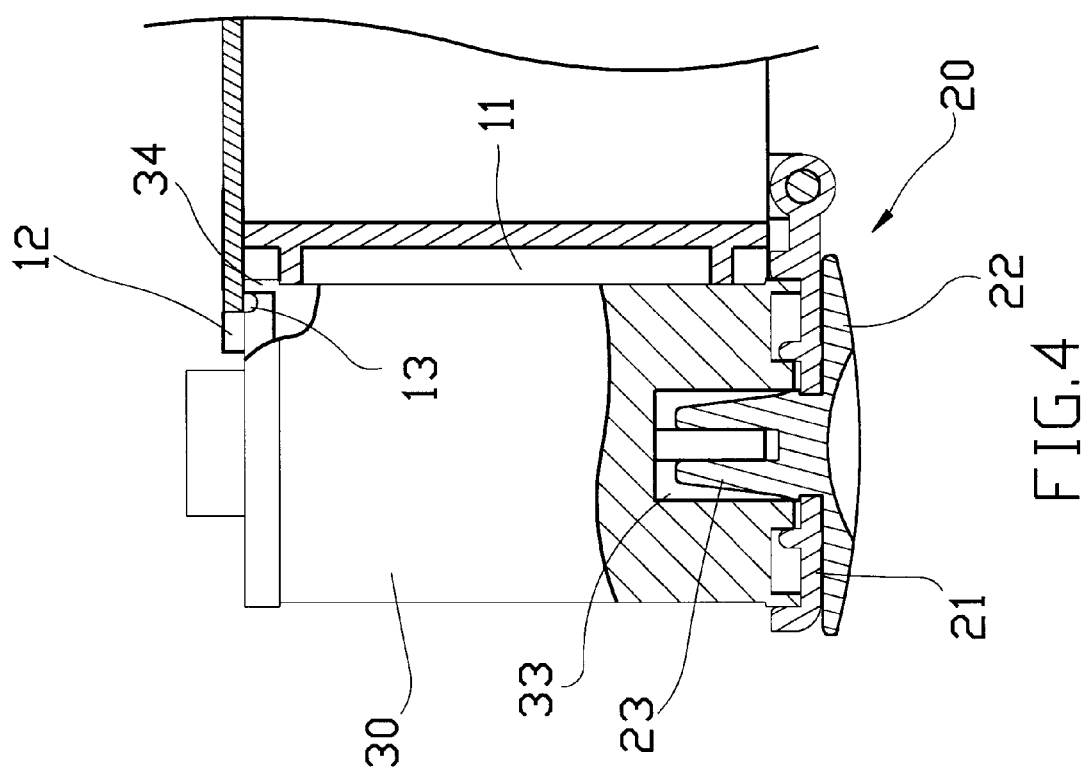
FIG. 4 is a sectional view of a film cartridge positioned to the preferred embodiment of the film cartridge mounting mechanism for an exterior film-feeding camera in accordance with the present invention.

The invention disclosed herein is directed to a film cartridge mounting mechanism for an exterior film-feeding camera. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

The film cartridge mounting mechanism for an exterior film-feeding camera according to the present invention is especially designed for use with a simple-structured camera using a 35-mm film. The main body 10 of the camera has an accommodation space 11 to receive a film shell 30. The accommodation space 11 has a positioning base 20 as its lower bound, and a top plate 12 as its upper bound. The contact surface between the main body 10 and the film cartridge 30 is arc shaped. The rest of the film cartridge 30 is exposed to the atmosphere. The film cartridge 30 is positioned in the accommodation space 11, by coping the restraints 13 located on the inner surfaces of the positioning base 20 and the top plate 12 with the bottom and the top ends of the film cartridge 30. Moreover, the film outlet 31 of the film cartridge 30 and the inlet 14 of the film-conveying slot 15 on the main body 10 are engaged in a light-proof manner.

Preferably, the positioning base 20 according to the present invention has a bowl-shaped part 21 with an upward opening. Under the bowl-shaped part 21, the positioning base 20 further comprises a film supporting node 22 with its claw 23 on the center towards the bowl-shaped part 21. The opening of the bowl-shaped part 21 allows the engagement with the bottom end of the film cartridge 30. Thereby, the claw 23 of the film supporting node 22 can plug into the pivot hole 34 of the film cartridge 30. In addition, the positioning base 20 and the bottom end of the main body 10 are pivotedly connected so that the positioning base 20 can rotate up and down accordingly.

Preferably, the two or three constraints 13 on the inner surface of the top plate 12 according to the present invention are protruding downward and cause the film cartridge 30 to be positioned by restraining the top rim 33 from insides.

Preferably, the rim of the bowl-shaped part 21 of the positioning base 20 has a shallow aperture 24. When the bottom end of the film cartridge 30 is engaged with the bowl-shaped part 21 of the positioning base 20, the film outlet 31 is directed toward the aperture 24. When installing a film cartridge 30, the exposed film 32 is inserted into the film-conveying slot 15 of the main body 10 via the inlet 14, and the film cartridge 30 is then pushed upward to cause the top end of the film cartridge 30 engaged with the inner surface of the top plate 12 by the restraints 13 positioning the top rim 33 of the film shell 30 from insides. Thereafter, the positioning base 20 is rotated upward to cause the bottom end of the film cartridge 30 engaged with the bowl-shaped part 21. Preferably, the rim of the bowl-shaped part 21 of the positioning base 20 is elastic so as to enhance the engagement with the bottom end of the film cartridge 30. Thereby, the film outlet 31 of the film cartridge 30 is pulled and inserted into the inlet 14 of the film-conveying slot 15 on the main body 10 to form a photo-proof inserting engagement. In actual practice, the light-proof layer (not shown in the figures) of the film outlet 31 of the film cartridge 30 is sufficient to provide a light-proof environment between the film outlet 31 of the film cartridge 30 and the inlet 14 of the film-conveying slot 15 on the main body 10. However, preferably, the inlet 14 further comprises soft light-proof stickers (not shown in the figures) insides thereof to further assure the light-proof application of the present invention.

Preferably, when the film cartridge 30 is anchored to the main body 10, the contact surface in between is a light-proof arc surface. Moreover, the rear cover 16 of the main body 10 is also designed to be light-proof to have an arc surface matching the arc shape of the film shell 30 in order to shield the inlet 14 from any light entrance.

According to a preferred embodiment of the present invention, the main body 10 further comprises a film-advancing node 40 on the rear surface of the main body 10. The film-advancing node 40 is used to drive the upper and the lower elastic advancing plates 41 and 42, which are protruding in the film-advancing direction. While pushing the film-advancing node 40 for film feeding, these two advancing plates 41 and 42 will plug into the upper and lower punch holes of the film 32, respectively, so that the exposed film 32 can be moved forwards to allow the unexposed films 32 to be moved into the dark space (i.e., the exposure chamber). When the film-advancing node 40 is moved back to its original position, these two elastic advancing plates 41 and 42 will slip past the punch holes 35 of the film 32, so that the position of the film 32 will be sustained without reversed advancing.

Figure 6:
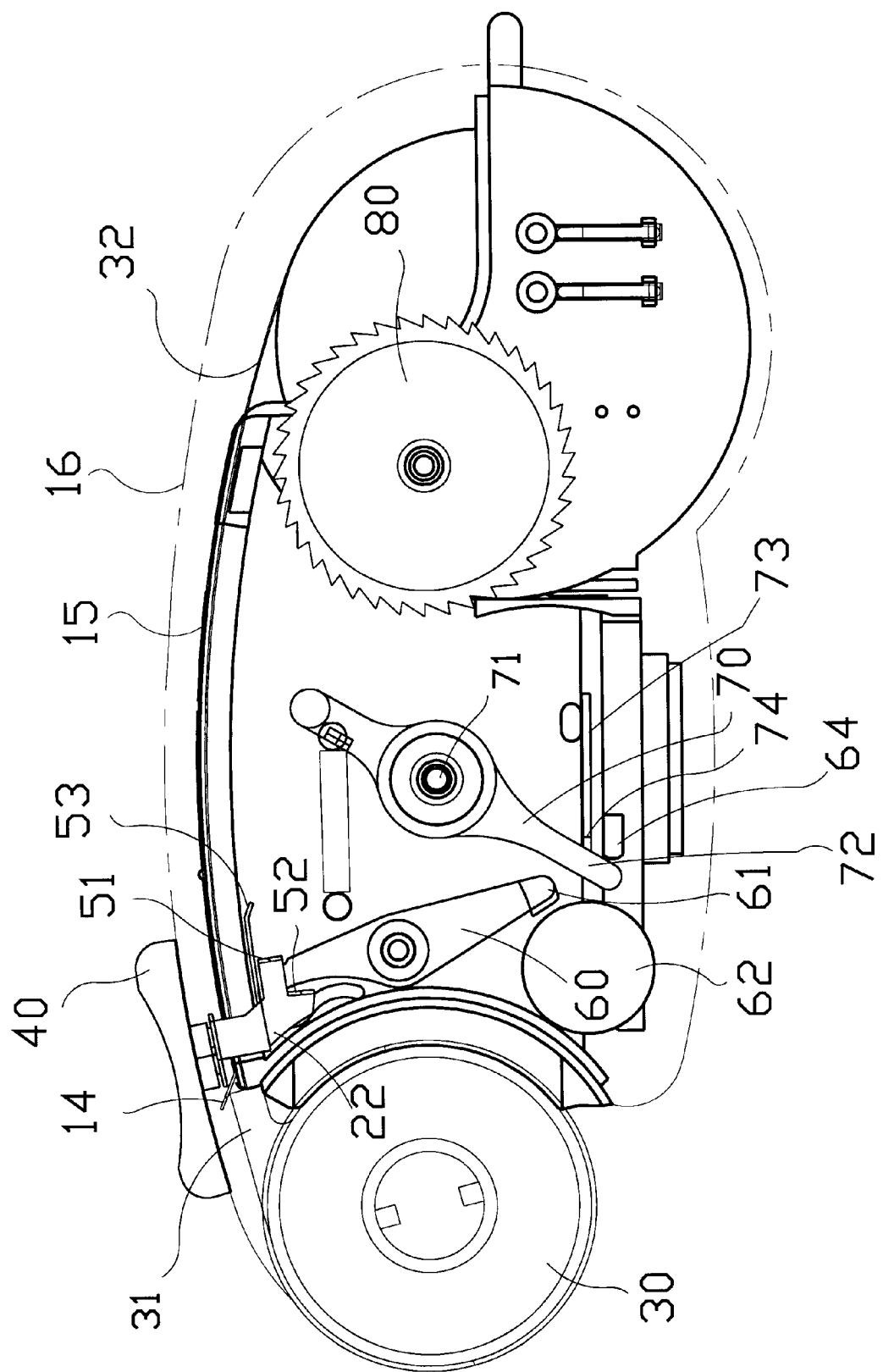
FIG. 6 is a top view of the preferred film-advancing unit of the film cartridge mounting mechanism for an exterior film-feeding camera in accordance with the present invention.
Figure 7:
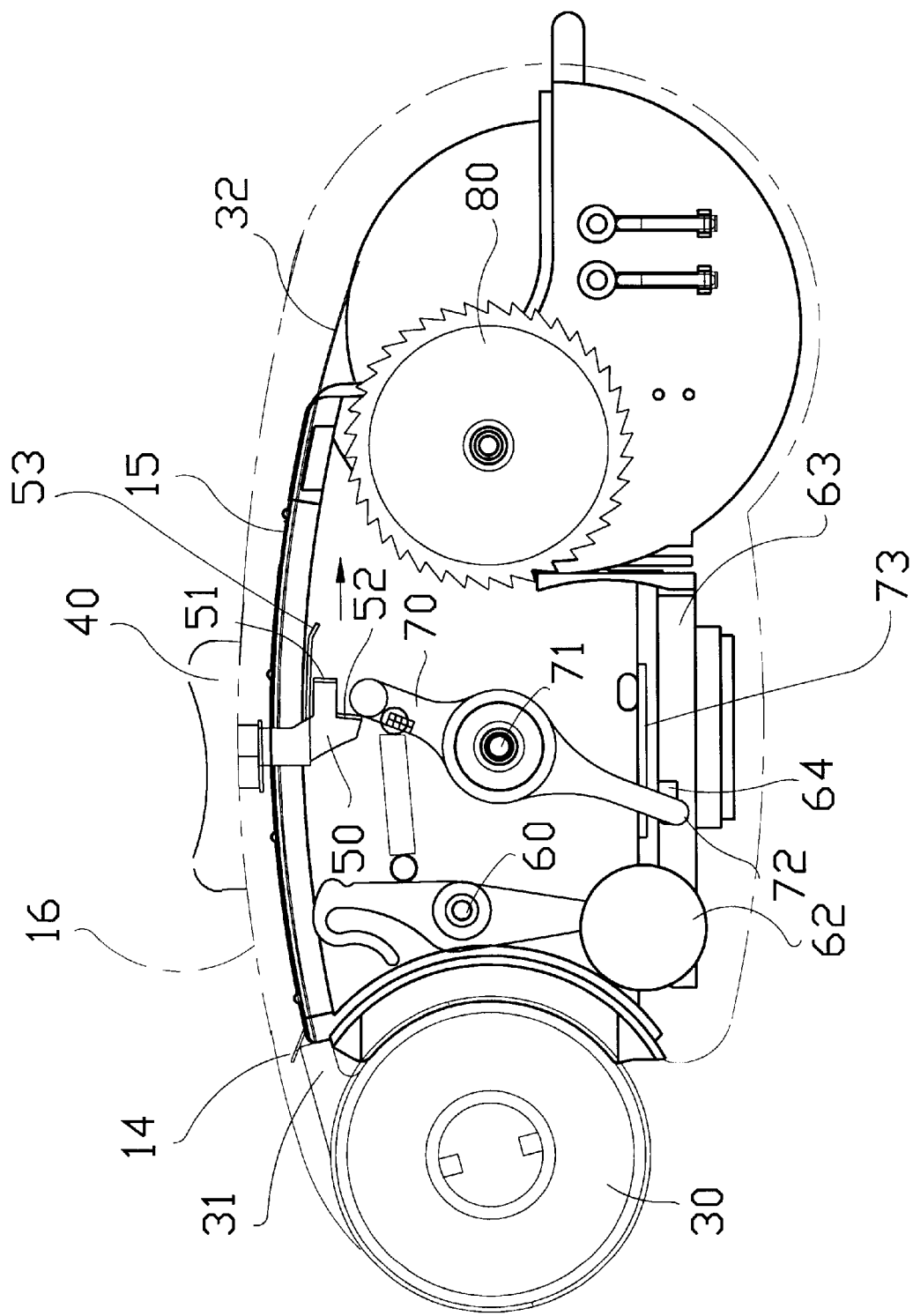
FIG. 7 is a schematic view of the preferred film cartridge mounting mechanism for an exterior film-feeding camera in accordance with the present invention at the moment while the actuating part driving the actuated plate of the shutter.
Figure 8:
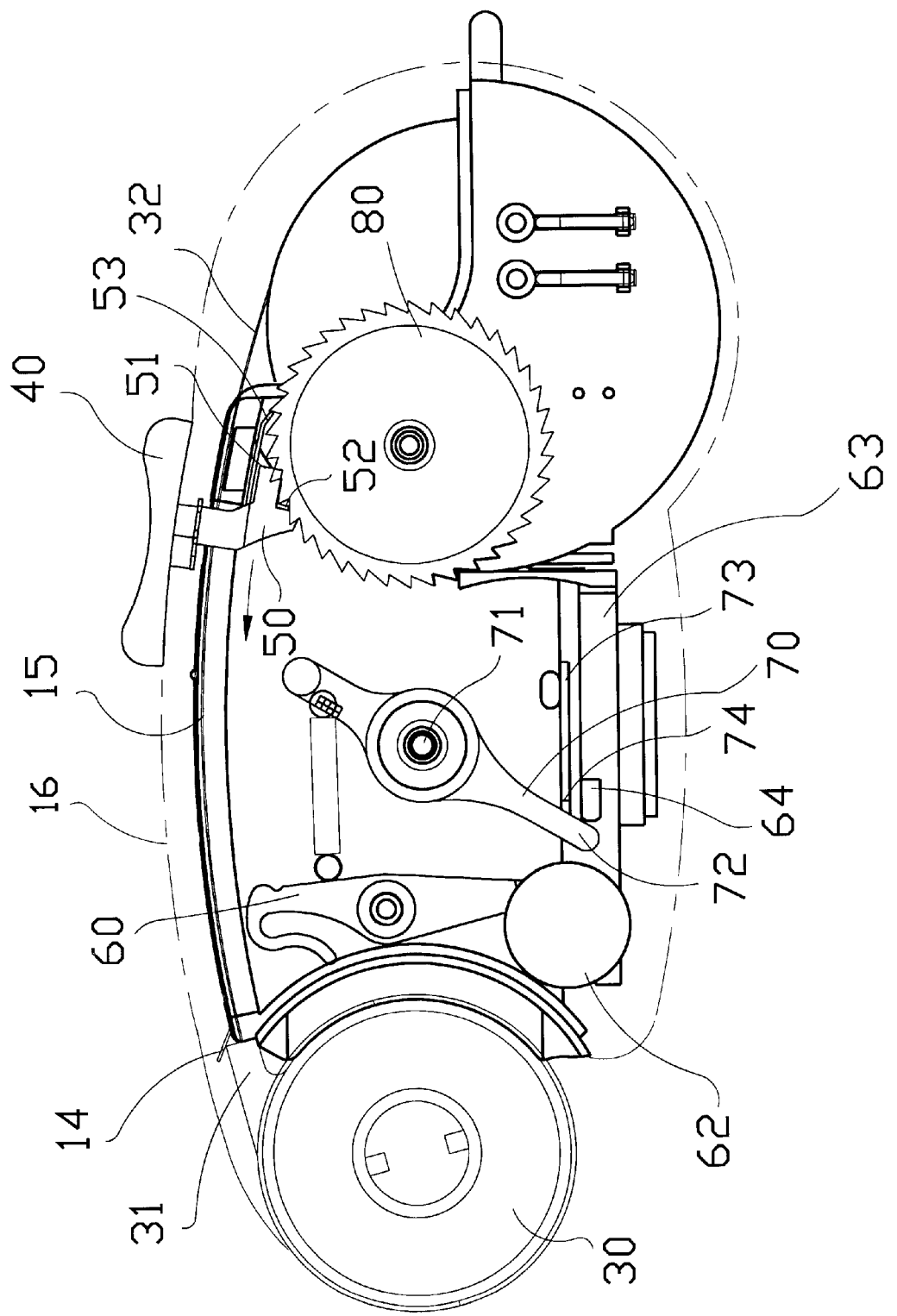
FIG. 8 is a schematic view of the preferred film cartridge mounting mechanism for an exterior film-feeding camera in accordance with the present invention at the moment while the actuating part driving the uni-directional gear.
Figure 9:
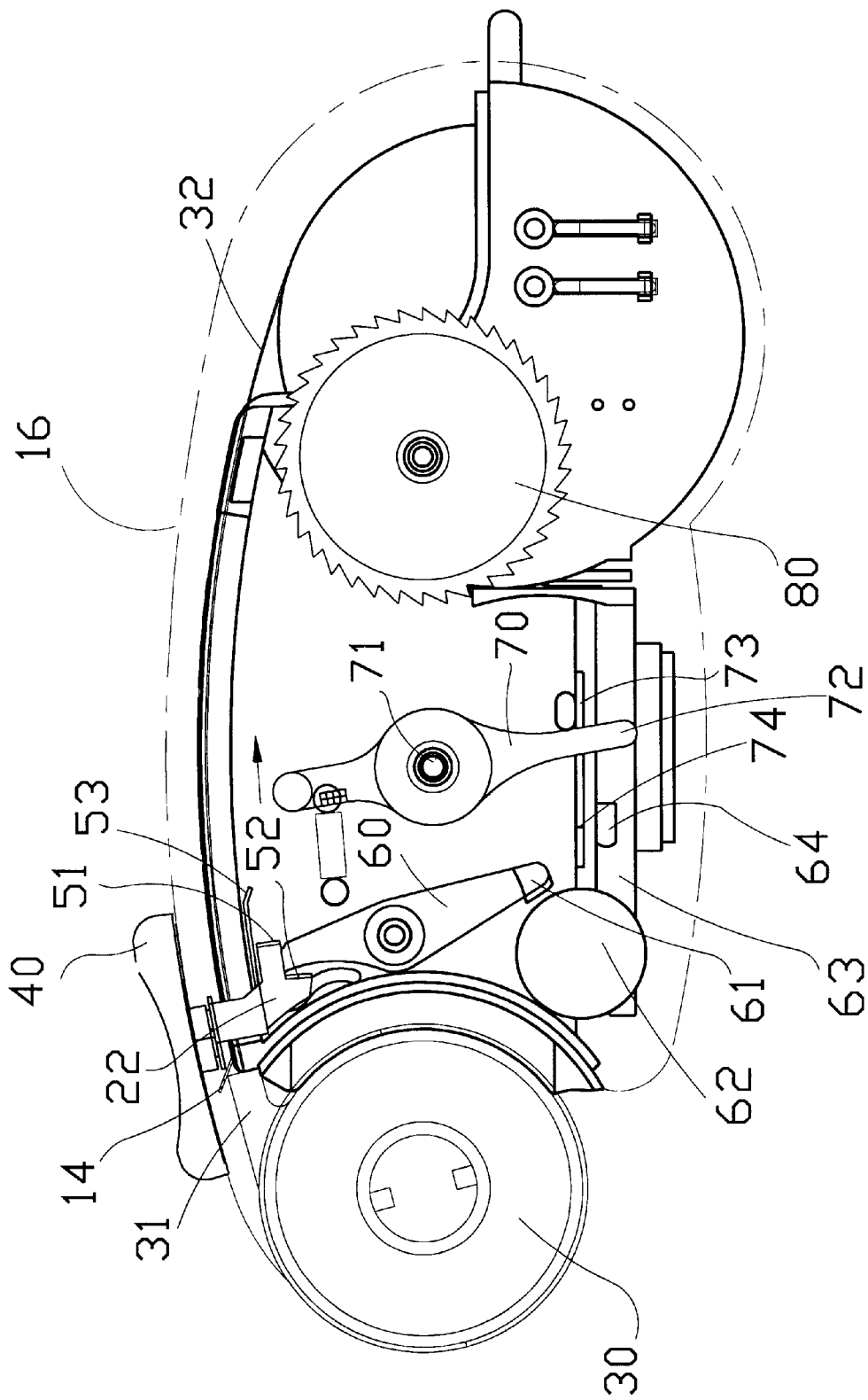
FIG. 9 is a schematic view of the preferred film cartridge mounting mechanism for an exterior film-feeding camera in accordance with the present invention after an exposure.
Figure 10:
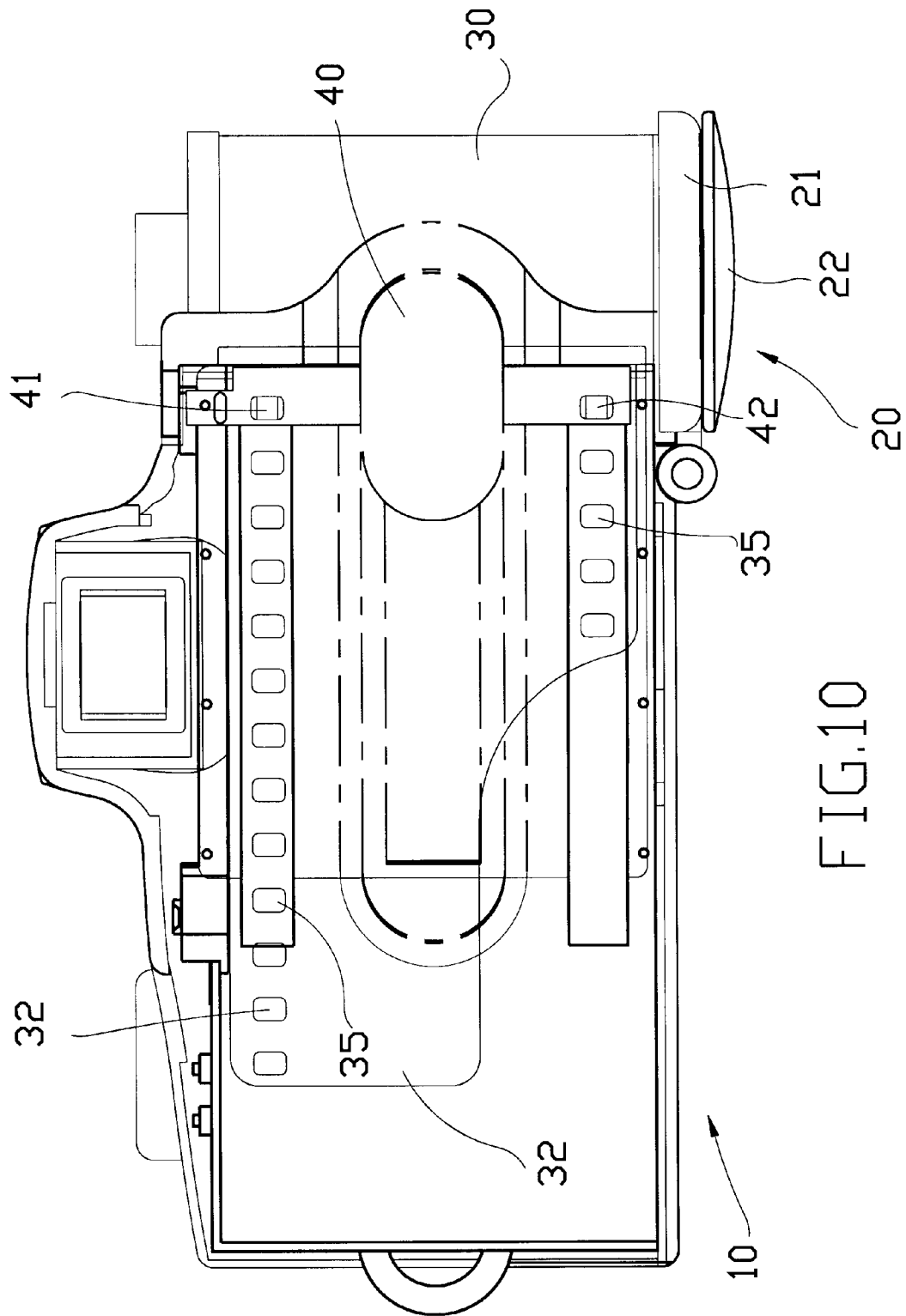
FIG. 10 is a rear view of the preferred film cartridge mounting mechanism for an exterior film-feeding camera in accordance with the present invention.

According to the preferred embodiment of the present invention, the actuating part 50 comprising three switching claws 51, 52, and 53 is located and connected to top of the film-advancing node 40. The first switching claw 51 is utilized to drive an elastic safety plate 60, the second claw 52 is utilized to drive the actuating plate 70 of the shutter, and the third claw 53 is utilized to rotate an uni-direction gear to a preset angle. When the safety plate 60 resumes its original position, its front end 61 is located under the shutter 62 to prevent possible accidental shuttering. As shown in FIG. 6, when the film-advancing node 40 at its origin, the first claw 51 is at the stage of actuating the front end 61 of the safety plate 60. At this time, the front end 61 of the safety plate 60 is moved away from the shutter 62 on top, and thus the shutter 62 is available for another exposure. When the film-advancing node 40 is moved, the safety plate 60 resumes back to its origin by its elasticity, and causes its front end 61 to be moved back to the safety position under the shutter 62. When the film-advancing node 40 is moving right to carry out the film advancing operation, the second claw 52 will push the actuating plate 70 of the shutter to rotate about the pivot joint 71 located at its center. At the rotation limit of the actuating plate 70, the front end 74 will be stopped by an extruding point 64 of the lever 63 located under the shutter 61. As shown in FIG. 8, when the front end 74 of the actuating plate 70 pass the protruding point 64, the actuating plate also passes the front end 74 of the shutter plate 73 and then the camera is ready for another exposure. When the film-advancing node 40 moves the film 32 to the right to the film advancing limit, the third claw 53 will rotate the uni-directional gear 80 for a preset angle. As the uni-directional gear 80 rotates the preset angle, a film 32 is advanced forward and the user can read the number of the exposed films 32 from a counting disk 81.

When the film-advancing node 40 resumes its original position after advancing a film 32, the actuating plate 70 of the shutter is now ready for another exposure, as shown in FIG. 6, and the shutter 61 can now be pressed downward. When the shutter 61 is pressed down, the lever 63 below is pressed down as well. At this moment, the actuating plate 70 of the shutter is released triggering the shutter plate 72 to carry out a photo-taking operation.

While a roll of film 32 is used up, the film supporting node 22 on top of the positioning base 20 can be utilized to rotate the center of the film cartridge 30 in order to roll up the films 32. Then, by moving the] bowl-shaped part 21 of the positioning base 20 away from bottom of the film cartridge 30 by hand and pulling the film shell 30 downwards away from the restraints 13, the film cartridge 30 can be removed from the positioning base 20, and another film cartridge 30 can be installed.

The film cartridge mounting mechanism for an exterior film-feeding camera in accordance with the present invention facilitates a film cartridge 30 to be positioned outside of the camera body. Thereby, the dimension and the weight of the camera can be reduced, and the exposure information printed on the film cartridge 30 is visible all the time. Most of all, the film cartridge mounting style and the concise component's movement achieved by the present invention provides the user more convenient and economic camera usage, and also makes possible a new generation of cameras in the future.

While the present invention has been particularly shown and described with reference to a preferred embodiment, it will be understood by those skilled in the art that various changes in form and detail may be without departing from the spirit and scope of the present invention.

I claim:

1. A film cartridge mounting mechanism for use in an exterior film-feeding camera comprising:

an exposed accommodation chamber on one side of a main body of the camera for receiving a film cartridge, said side of said main body adjoining said exposed accommodation chamber has an arc-shaped surface to accommodate the film cartridge;

a positioning base and a top plate provided in said accommodation chamber, wherein said positioning base and said top plate form a lower bound and upper bound, respectively, of said accommodation chamber;

a plurality of restraints provided in said positioning base and said top plate for anchoring a film cartridge; and an inlet for introducing a film from an outlet of the film cartridge into a film-conveying slot in the camera main body in a light-proof manner.

2. The film cartridge mounting mechanism for use in an exterior film-feeding camera according to claim 1, wherein said positioning base and the camera main body are pivotably connected so that said positioning base is capable of pivoting up and down;

said positioning base further comprising a bowl-shaped member with its mouth facing upwards to facilitate receiving the film cartridge;

and said bowl-shaped member comprising a film support node with a claw on a center of said bowl-shaped part capable of plugging into a center pivot hole of the film cartridge.

3. The film cartridge mounting mechanism for use in an exterior film-feeding camera according to claim 2, wherein said bowl-shaped member of said positioning base further comprises a shallow aperture on the rim of said bowl-shaped member to be aligned with a film outlet of the film cartridge.

4. The film cartridge mounting mechanism for use in an exterior film-feeding camera according to claim 1, wherein said top plate comprises three constraints on a lower surface thereof which protrude downward to position the film cartridge by restraining a top rim of the film cartridge from inside of the top rim of the film cartridge.

* * * * *